June 2, 1964  R. E. DUNKLEE, JR  3,135,279
FLUID FEEDING DEVICE
Filed May 10, 1961
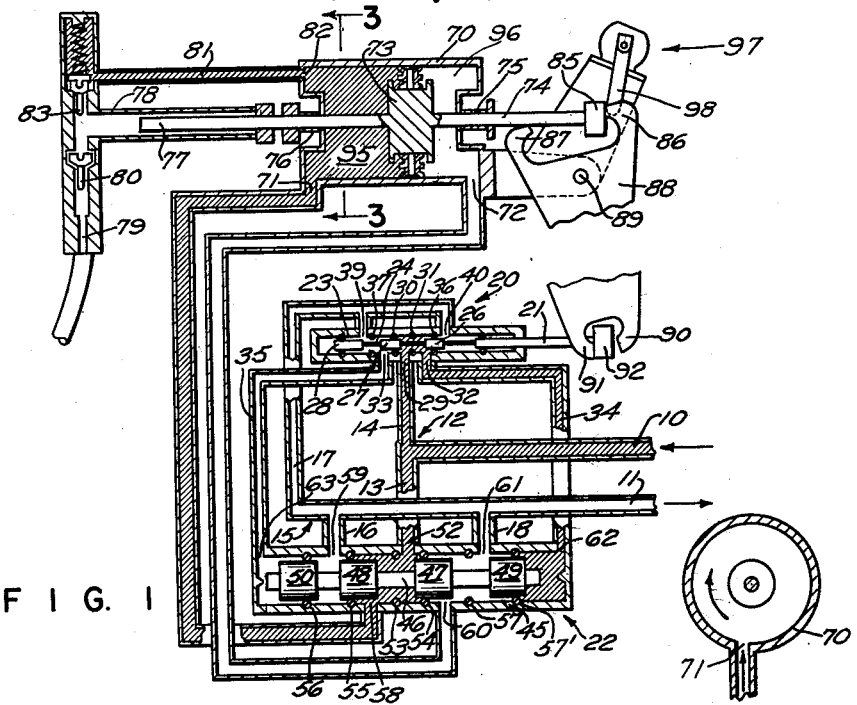
FIG. 1
FIG. 3
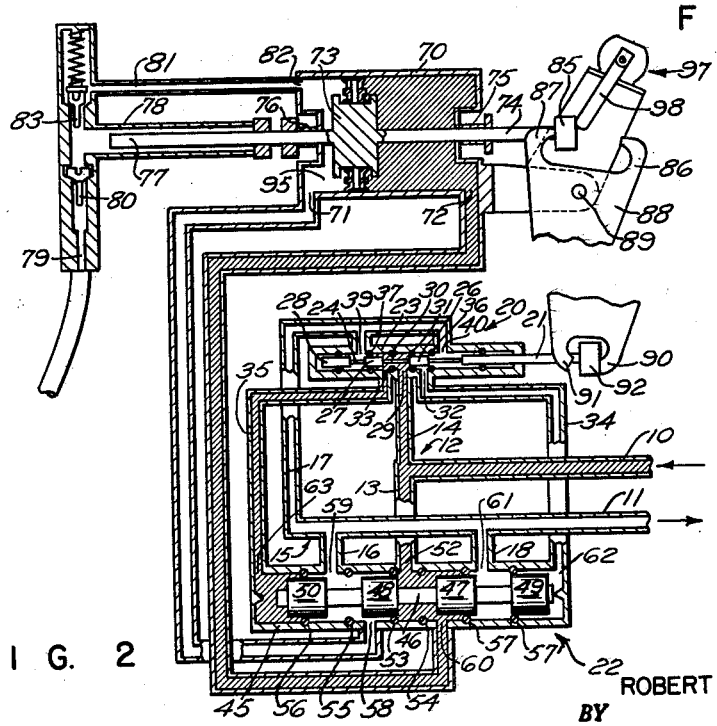
FIG. 2
INVENTOR.
ROBERT E. DUNKLEE, JR
BY
*Barlow & Barlow*
ATTORNEYS ated June 2, 1964

3,135,279
FLUID FEEDING DEVICE
Robert E. Dunklee, Jr., North Scituate, R.I., assignor, by mesne assignments, to Charles G. Haire, Cranston, R.I., and Roy C. Olson, Rockton, Ill.
Filed May 10, 1961, Ser. No. 109,027
9 Claims. (Cl. 137—99)

This invention relates to a feeding device which is particularly adapted for adding a second liquid to a first liquid in proportion to the rate of flow of the first liquid.

According to this invention the liquid stream to which additions are to be made is caused to flow through a casing in which is mounted a reciprocating metering piston, the piston being operable by the liquid stream. Coupled to the metering piston is a reversing valve mechanism so that the stream may be diverted from first one side of the piston to the other side thereof, and the motion of the metering piston through its piston rod will control the amount of second liquid to be added. Specifically, the metering piston operates a small pump in the form of a plunger which successively introduces into the main stream quantities of the second liquid to be added. Since the piston is a positive displacement type of device, the ratio of the liquid added to the incoming stream will remain constant despite changes in velocity of the incoming stream since the volume of the liquid added is proportional to the displacement of the piston.

It is accordingly a main object of the present invention to provide an improved proportioning apparatus which will add a definite proportion of liquid to a main flowing body of liquid over a wide range of flow rates of the main liquid.

Another object of the invention is to provide a proportioning apparatus which will maintain the ratio of the liquid added to the flowing stream constant despite changes in velocity of the flowing stream.

A further object of the invention is to provide in a proportioning apparatus a flow path which is self-purging so as to enable foreign matter to pass readily therethrough without affecting the operation of the device.

A still further object of the invention is to provide a proportioning apparatus which is completely self-lubricated.

With these and other objects in view, the invention consists of certain novel features of construction as will be more fully described and particularly pointed out in the appended claims.

In the accompanying drawings:

FIGURE 1 is a diagrammatic view of the proportioning apparatus made in accordance with this invention;

FIGURE 2 is another diagrammatic view of the proportioning apparatus in another operative position thereof; and FIGURE 3 is a sectional view taken on lines 3—3 of FIGURE 1.

Referring to the drawing, the apparatus is intended to be placed in a main fluid flow conduit and is accordingly provided with an inlet pipe 10 and an outlet pipe 11. The inlet pipe 10 branches as at 12 into a main conduit 13 and a control conduit 14. Similarly, the discharge pipe 11 branches as at 15 into a main conduit 16 and control conduit 17 and has a further main branch as at 18. The control conduits 14 and 17 connect to a pilot valve generally indicated at 20 which is a four-way valve actuated by a rod 21. Conduits 13, 16 and 18 connect to a main four-way valve designated generally 22.

The pilot valve 20 consists generally of a casing 23 having a spool 24 received therein which spool has a number of enlarged sections 26, 27 and 28. The control conduit 14 connects to the valve body through a port 29 which is surrounded on both sides thereof with O-rings 30 and 31. On either side of the port 29 are a pair of ports 32, 33 which connect, respectively, to control conduits 34, 35 and which have disposed on either side thereof O-rings 31, 36 and 30, 37 respectively. It will be appreciated that as the valve spool 24 reciprocates, communication may be had alternately between conduits 14 and 34 and conduits 14 and 35, which are the two positions illustrated in FIGURES 1 and 2 of the drawings. Additionally, conduit 17 connects at two locations into the pilot valve body as at ports 39 and 40 so that communication may be had between conduit 17 and conduit 35 or conduit 34 as the case might be.

The main valve 22 is composed of a body 45 having received therein a valve spool 46 with two enlarged portions 47 and 48 thereon together with piston ends 49 and 50. Centrally of the valve body 45 there is located a port 52 to which is connected conduit 13 and within the body on either side of the port 52 are located O-rings 53 and 54 in spaced relation to each other and on either side of the central port 52 additional O-rings are located as at 55, 56, 57 and 57'. Between O-rings 53 and 55 a port 58 is located, while between O-rings 55 and 56 a port 59 is located. Similarly, between O-rings 54 and 57 a port 60 is located, and between O-rings 57 and 57' a port 61 is located. At the ends of the valve body 45 communication is had with the conduits 34 and 35, respectively, as at port 62 and 63. In this fashion when the valve spool 46 is reciprocated by means which will presently be described communication may be alternately had between port 52 and ports 58 or 60 and ports 60 and 61 or ports 58 and 59 respectively.

From the above description it will be seen that the main valve spool 46 is nothing but a free floating spool that may reciprocate within the body 45 and be moved when pressure is applied either at the port 62 or 63. Thus, the valve spool 46 will move to the left as viewed in the drawing when the pressure at port 62 exceeds that at port 63, and the converse will of course be true. In this fashion shifting of the valve operation may be had.

In the present operation so far described, the pilot valve 20 causes operation of the main valve 22. For purposes of description let us assume that the pilot valve spool 24 is in its extreme right-hand position as viewed in the drawings and as particularly illustrated in FIGURE 1. In this position with water or other fluid being present in the conduit 10, this fluid will pass via conduit 14 and through port 29 into the pilot valve body, where due to the position of the valve spool 24 communication is had out port 32 and through conduit 34 to port 62 of the main valve 22. Since the port 63 of the main valve 22 is connected via conduit 35 and through ports 33, 39 to a discharge conduit 17 that connects with the discharge conduit 11, which conduit being a discharge conduit will be at a lower pressure than the inlet conduit, the valve spool 46 will move to the left as viewed in FIGURE 1 of the drawing. When this occurs, communication may then be had between the ports 52 and 58 and ports 60 and 61. On the other hand, should the pilot valve spool 24 be moved to the left as viewed in FIGURE 2 of the drawing, then communication is had from the inlet conduit 10 via conduit 14 through port 29 and out port 33. This will then supply the fluid pressure existing at the inlet 10 over conduit 35 to port 63 and since port 62 is connected over conduit 34 through ports 32 and 40 and conduit 17 to discharge outlet 11, where a lower pressure is had, the valve spool 46 will move to the right as viewed in the drawing, permitting communication between ports 52 and 60 and ports 58 and 59. Thus the movement of the spool 24 of the pilot valve 20 will in turn cause reciprocation movement of the main valve spool 46 and a switching operation.

The ports 58 and 60 connect to a metering cylinder generally designated 70 and respectively to opposite ends thereof as at 71 and 72. Received within the metering cylinder 70 is a reciprocating metering piston 73 which has a piston rod 74 coupled thereto passing through the meter cylinder 70 at packings 75, 76 and which terminates in a plunger 77 received within a pump cylinder 78. The second liquid to be added to the flowing stream is connected to the pump cylinder 78 at the duct 79 which is provided with a check valve 80. A discharge pipe 81 leads from the pump cylinder 78 through a check valve 83 into the metering cylinder 70 as at 82.

To couple the motion of metering piston 73 to the pilot valve 20, the end of the piston rod 74 is provided with an enlarged cylindrical disk 85 which is received between two upstanding and spaced arms 86, 87 of a link 88 which is arranged for pivotal movement about a point 89. The other end of the link is provided with a pair of abutments 90, 91 which receive therebetween an enlarged disk 92 mounted on the end of the pilot valve spool 21. Looking first at FIGURE 1, it will be seen that as the piston rod 74 moves to the right as viewed in the drawing, the disk 85 will abut the arm 86 and pivot the link 88 clockwise as viewed in the drawing, thus moving the pilot valve spool 21 to the left as viewed in the drawing. Similarly but reversely, as the piston rod 74 moves to the left as shown in FIGURE 2, the disk 85 will abut the arm 87 and rotate the link 88 counterclockwise moving the pilot valve spool 21 to the right as viewed in the drawing.

In operation the reciprocation of the piston 73 is controlled by the main valve 22 which causes liquid to flow alternately into the metering cylinder 70 through ports 71 or 72, since the ends of the metering cylinder 70 are alternately put into communication with the liquid supply inlet 10. The plunger 77 reciprocates with the piston 73, and at each reciprocation or complete cycle thereof, a definite volume of a second liquid from the supply pipe 79 is pumped through the discharge pipe 81 into the metering cylinder 70.

Referring now to FIGURE 1, it will be seen that the liquid supply inlet 10 is connected through the main valve 22 and out the port 58 into port 71 of the metering cylinder 70. This will cause the piston 73 to move to the right as viewed in the drawing, the plunger 77 also moving to the right, sucking in a certain quantity of fluid to be added through the check valve 80 into cylinder 78. During this action, port 72 of the metering cylinder is connected through ports 60 and 61 of valve 22 to discharge 11. When the disk 85 contacts the arm 86 of the link 88, further motion will cause clockwise rotation of the link 88 to change the position of the pilot valve 20. Physically the valve spool 24 is moved, and the switching action occurs as soon as enlarged portion 26 seals port 32, the enlarged portion 27 at this point beginning to unseal port 33. This change of position of the pilot valve 20 will now bring about the condition shown in FIGURE 2, where the liquid inlet pipe 10 is connected through the main valve 22 and out the port 60 into the port 72 of the meter cylinder 70. This now causes the piston 73 to move to the left as viewed in the drawing together with the plunger 77 which will now force the liquid to be added which was previously drawn into the cylinder 78, out through the check valve 83 and through pipe 81 into the fluid existing in the section 95 of the metering cylinder 70. By referring now to FIGURE 3 of the drawing, it will be seen that the liquid which is forced through the port 71 of the cylinder 70 is added at a point that is tangential to the general cylindrical cross section of the cylinder 70. In this fashion the liquid acquires a swirling motion in section 95 which motion continues on the discharge stroke assuring thorough mixing with the second liquid during the following discharge stroke.

As the piston 73 is moving to the left, the disk 85 will engage the arm 87 of the link 88 rotating the link in a counterclockwise direction as viewed in the drawings and consequently moving the pilot valve spool 24 of the pilot valve 20. As soon as the enlarged portion 27 of the spool has sealed the port 33, the spool 26 will have moved far enough to just barely unseal the port 32, and a switching action takes place, the main valve spool 46 moving to the left to the position as shown in FIGURE 1. It will now be seen that communication is had out of port 58 for the fluid supply from the inlet 10. This will be sent to the port 71 of the meter cylinder 70, causing the metering piston 73 to move to the right as viewed in the drawings, and during this motion the liquid which was in the space 96 is ejected out port 72 and through ports 60 and 61 of the main valve 22 to the discharge pipe 11.

From the above it will be appreciated that the metering cylinder 70 is basically filled twice for each single treatment fluid addition. The volume of the liquid added to the metering cylinder may be varied by changing the diameter of the plunger 77 relative to the diameter of the piston 73 which is most easily accomplished by changing the entire rod assembly 74 or by adding a different diameter plunger 77 to an existing rod. In the construction described, it is further apparent that the device is positive acting and can never be placed in inoperative position by the pilot valve. This comes about since the main valve spool remains in one position retained by the sealing friction of the O-rings on the enlarged portions until a definite reversal of pressure occurs of a sufficient amount to cause it to move and it continues to move until it is stopped by the confines of the valve body or until the resulting reversal of the pilot valve spool and the metering piston 73 which will bring about a reduction in the pressure differential across the main valve 22 as will occur in conditions of low flow.

In order to determine and indicate the quantity of fluid passing through the device, a ratchet counter 97 may be mounted adjacent the link 88 so that its operating finger 98 engages the disk 85 and remains engaged by spring urgence built into the counter mechanism. In this manner the counter will register one count for every piston 73 cycle, and when multiplied by a constant factor, the digital output of the ratchet counter will indicate a gallonage or other measuring unit output of the device.

I claim:

1. An apparatus for adding, to a stream of liquid, unit quantities of a second liquid in pre-determined ratio by volume, said apparatus comprising conduit means through which the stream of liquid flows, a metering cylinder located in said conduit means, said metering cylinder having a reciprocating piston located therein, a first valve means located in said conduit means for alternately switching the flow from one side of the piston to the other side thereof, positive-displacement hydraulic motor means for actuating said first valve means to effect such alternate switching, a second valve means connected to said conduit and controlling said hydraulic motor means, a mechanical operating connection between said piston and said second valve means, said connection being operable at the end of each piston stroke to actuate said second valve to a position in which it connects the motor means to shift the first valve to a position connecting the flow for actuating the piston through a successive stroke in the opposite direction, said metering cylinder and said motor means being connected in parallel in said conduit means and for carrying all flow through said conduit means, a pump operatively connected to said piston, second liquid supply means connected to said pump and second liquid discharge means connected from said pump to said conduit means, whereby successive unit quantities of said second liquid are drawn from said supply means and discharged into said conduit means and said first liquid in a definite ratio to the volume of flow of the stream of liquid through said conduit means.

2. An apparatus as in claim 1 wherein the second liquid discharge means is connected to one end of said cylinder for mixing the liquids therein.

3. An apparatus as in claim 2 wherein the mixing occurs during the discharge stroke of the metering piston.

4. An apparatus as in claim 2 wherein the conduit means is connected to the body of the cylinder on a tangent of the cross-section thereof to cause a swirling of liquids in the cylinder.

5. Apparatus for adding to a stream of a first liquid a predetermined volumetric proportion of a second liquid, comprising inlet and outlet conduits for connection into a flow line to carry the entire stream of the first liquid, a positive-displacement meter having a driven element and means forming oppositely-acting displacement chambers for metering flow of said first liquid and driving said driven element through successive strokes proportional to such flow, a first four-way valve having a primary valve element movable between a first position, in which the valve connects one of said meter displacement chambers to the inlet conduit and the other to the outlet conduit whereby flow between the conduits will drive the meter through a metering stroke, and a second position, in which the valve connects the displacement chambers oppositely to the conduits whereby flow between the conduits will drive the meter through a successive metering stroke, hydraulic motor means operable in response to flow displacement in a pair of displacement chambers and connected to actuate said first four-way valve between its said two positions, a second four-way valve having a secondary valve element shiftable between a first position, in which the valve connects one of the motor displacement chambers to the inlet conduit and the other to the outlet conduit whereby flow between the conduits will drive the motor means through a power stroke to actuate the first valve from one to the other of its said two positions, and a second position, in which the valve connects the motor-displacement chambers oppositely to the conduits whereby flow between the conduits will drive the motor means to actuate the first valve oppositely between its said two positions, mechanical means driven by said meter and operable at the end of each meter stroke to shift said second four-way valve from its existing position to its opposite position for reversing the connections between the conduits and the motor and thereby connecting the motor to the conduits to cause flow between the conduits to reverse the connections between the conduits and the meter, and a positive displacement pump operatively connected to said meter for displacement movement proportional to that of the meter, pump inlet means for connecting the pump to a supply of a second liquid, and pump discharge means connecting the pump to discharge into the stream of first liquid, whereby total flow of said first liquid will consist of metered flow through said meter and of motor displacement flow in predetermined relation to such metered flow, and said pump will pump quantities of said second liquid into the stream of first liquid in a predetermined definite volumetric proportion.

6. Apparatus for adding to a stream of a first liquid, a predetermined volumetric proportion of a second liquid, comprising inlet and outlet conduits for receiving and discharging the first liquid, a reciprocating-stroke, positive-displacement meter forming a metering flow connection between said conduits, first valve means connecting said meter to said conduits and controlling the stroke reciprocation thereof, a positive-displacement motor having a displacement proportional to said meter displacement, forming a secondary flow connection between said conduits, and mechanically connected to operate said first valve means controlling the stroke reciprocation of the meter, second valve means connecting said motor to said conduits and controlling the motor operation of said first valve means, mechanical means actuated by said meter and operatively connected to actuate said second valve means to cause said motor to perate the first valve means in response to predetermined flow through said secondary flow connection and thereby, in turn, to permit and control meter-actuating flow through said metering flow connection, and a positive-displacement pump actuated by said meter and having a displacement proportional to that of said meter, means for connecting the inlet of said pump to a source of a second liquid, and means connecting said pump to discharge into the stream of first liquid flowing between said conduits, the flow through said secondary flow connection being proportional to that through the metering flow connection.

7. Apparatus as defined in claim 6 in which the meter includes a displacement chamber from which first liquid is discharged to the outlet conduit concurrently with discharge of second liquid from said pump, and in which the pump is connected to discharge to said displacement chamber, whereby the second liquid is added to the first on the discharge side of the meter and the movement of liquid in and from said chamber produces mixing of the two liquids.

8. Apparatus as set forth in claim 6, in which said meter comprises a reciprocating element, driven successively in opposite directions by metered flow, and said mechanical means comprises a valve-operating member for operating said second valve, said reciprocating element being arranged to make positive drive engagement with the valve-operating member during an end portion of each meter stroke and to drive said valve-operating member positively through a valve-reversing movement.

9. Apparatus as set forth in claim 6, in which said first valve means comprises a spool valve having spaced cylindrical lands separated by at least one reduced section to pass flow, a casing surrounding said spool valve and in which the valve is axially reciprocable, axially spaced ports in said casing, and resilient annular seals fixed within the casing between the ports in axially spaced relation, the cylindrical lands being movable into and out of engagement with said annular seals to change the connections made by said reduced section between the ports.

References Cited in the file of this patent

UNITED STATES PATENTS

| | | |
|---|---|---|
| 2,203,832 | Malburg | June 11, 1940 |
| 2,422,062 | Yard | June 10, 1947 |
| 2,590,007 | Grigwold | Mar. 18, 1952 |
| 2,803,260 | Wells | Aug. 20, 1957 |
| 2,920,640 | Porter | Jan. 12, 1960 |